US012116258B2

(12) United States Patent
Wu et al.

(10) Patent No.: US 12,116,258 B2
(45) Date of Patent: Oct. 15, 2024

(54) FAUCET DEVICE WITH A SELF-CLEANING FUNCTION AND A METHOD OF SUPPLYING A BEVERAGE THEREFROM

(71) Applicant: Xiamen Solex High-Tech Industries Co., Ltd., Xiamen (CN)

(72) Inventors: Jie Wu, Xiamen (CN); Lihong Hu, Xiamen (CN); Wenxing Chen, Xiamen (CN); Yicong Xie, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 283 days.

(21) Appl. No.: 17/363,246

(22) Filed: Jun. 30, 2021

(65) Prior Publication Data

US 2021/0403305 A1 Dec. 30, 2021

(30) Foreign Application Priority Data

Jun. 30, 2020 (CN) ......................... 202010621438.7

(51) Int. Cl.

*B67D 1/07* (2006.01)
*B08B 9/032* (2006.01)
*E03C 1/046* (2006.01)

(52) U.S. Cl.

CPC .............. *B67D 1/07* (2013.01); *B08B 9/0325* (2013.01); *B08B 9/0328* (2013.01); *E03C 1/046* (2013.01); *Y10T 137/9464* (2015.04)

(58) Field of Classification Search

CPC ... Y10T 137/9464; B67D 1/07; B08B 9/0325; B08B 9/0328; E03C 1/046

See application file for complete search history.

(56) References Cited

U.S. PATENT DOCUMENTS

| | | | | |
|---|---|---|---|---|
| 7,228,874 | B2 * | 6/2007 | Bolderheij | E03C 1/055 222/145.5 |
| 9,976,290 | B2 * | 5/2018 | Evans | F16K 19/006 |
| 10,087,608 | B2 * | 10/2018 | Dobizl | E03C 1/046 |
| 10,113,739 | B2 * | 10/2018 | Schneider | F21V 23/0457 |
| 10,351,408 | B2 * | 7/2019 | Zemko | B67D 1/07 |
| 10,428,498 | B1 * | 10/2019 | Montague | E03C 1/057 |
| 10,624,503 | B2 * | 4/2020 | Tramontina | A47K 5/1217 |
| 10,752,489 | B1 * | 8/2020 | Alger | B67D 1/0841 |
| 10,801,190 | B2 * | 10/2020 | Chandler | E03C 1/057 |
| 11,058,261 | B2 * | 7/2021 | Bullock | A47K 5/1211 |
| 11,299,876 | B2 * | 4/2022 | Polly | E03C 1/055 |
| 11,534,730 | B1 * | 12/2022 | Springer | B67D 1/07 |

(Continued)

*Primary Examiner* — Daphne M Barry
*Assistant Examiner* — Frederick D Soski
(74) *Attorney, Agent, or Firm* — Cooper Legal Group, LLC

(57) ABSTRACT

The present disclosure discloses a faucet device with a self-cleaning function, comprising: a faucet mechanism, a control mechanism, a self-cleaning mechanism, and a beverage inlet passage. The beverage inlet passage is configured to be in communication with a beverage source, the faucet mechanism comprises a first passage configured to be in communication with a water source and a second passage configured to be in communication with a beverage source, and the control mechanism is connected to an inlet of the second passage, the beverage inlet passage, and the self-cleaning mechanism to control the beverage inlet passage to supply a beverage supplied by the beverage source to the second passage or to enable the second passage to be cleaned by the self-cleaning mechanism.

16 Claims, 10 Drawing Sheets

(56) References Cited

U.S. PATENT DOCUMENTS

| | | | | |
|---|---|---|---|---|
| 11,549,244 | B2 * | 1/2023 | Alteon | E03C 1/057 |
| 11,662,131 | B1 * | 5/2023 | Black | F25D 23/12<br>222/146.6 |
| 2005/0045549 | A1 * | 3/2005 | Lutich | C02F 1/281<br>210/295 |
| 2014/0359935 | A1 * | 12/2014 | Veros | E03C 1/055<br>4/677 |
| 2015/0292187 | A1 * | 10/2015 | Tseng | E03C 1/0412<br>4/677 |
| 2015/0354185 | A1 * | 12/2015 | Tseng | F21V 23/002<br>4/678 |
| 2015/0368085 | A1 * | 12/2015 | Bond | B67D 3/0025<br>222/146.6 |
| 2016/0297663 | A1 * | 10/2016 | Zemko | B67D 1/07 |
| 2018/0103807 | A1 * | 4/2018 | Burgo, Sr. | E03C 1/046 |
| 2018/0362319 | A1 * | 12/2018 | Park | B67D 1/07 |
| 2019/0010044 | A1 * | 1/2019 | Jaillet, Jr. | B67D 1/0835 |
| 2019/0059659 | A1 * | 2/2019 | Burgo, Sr. | A47K 5/1202 |
| 2019/0070643 | A1 * | 3/2019 | Wong | B08B 9/0325 |
| 2019/0382990 | A1 * | 12/2019 | Tracy | F16K 31/02 |
| 2020/0080033 | A1 * | 3/2020 | Park | C12C 11/006 |
| 2020/0102527 | A1 * | 4/2020 | Hong | B65D 1/323 |
| 2020/0157477 | A1 * | 5/2020 | Lee | C12C 11/006 |
| 2020/0208084 | A1 * | 7/2020 | Lee | B67D 1/004 |
| 2021/0206617 | A1 * | 7/2021 | Maharaj | B67D 1/10 |
| 2022/0144619 | A1 * | 5/2022 | Otto | B67D 1/0888 |
| 2023/0069295 | A1 * | 3/2023 | Algül | B08B 9/0325 |
| 2023/0132444 | A1 * | 5/2023 | Pugliese | B67D 1/0021<br>222/129 |
| 2023/0138611 | A1 * | 5/2023 | Kudirka | B67D 1/16<br>222/52 |

* cited by examiner

FAUCET DEVICE WITH A SELF-CLEANING FUNCTION AND A METHOD OF SUPPLYING A BEVERAGE THEREFROM

RELATED APPLICATIONS

This application claims priority to Chinese patent application number 202010621438.7, filed on Jun. 30, 2020. Chinese patent application number 202010621438.7 is incorporated herein by reference.

FIELD OF THE DISCLOSURE

The present disclosure relates to a technical field of kitchen and bathroom, and in particular relates to a faucet device with a self-cleaning function and a method of supplying a beverage therefrom.

BACKGROUND OF THE DISCLOSURE

There exists a faucet device that also supplies a beverage. The faucet comprises a beverage tube whose one end is in communication with a beverage source, and the other end discharges a beverage. The beverage contains some ingredients (e.g., sugar or starch) that easily adhere to an inner wall of the beverage tube, causing the beverage tube to need to be cleaned. The beverage tube of the existing faucet device is detached when the beverage tube needs to be cleaned.

Chinese patent CN109153558A discloses a beverage faucet device, and the beverage faucet device comprises a faucet housing defining an inner chamber and a head portion defining a liquid passage. The liquid passage comprises an inlet, an outlet, and a valve receiving groove defined in the liquid passage. The head portion comprises a valve starter and an operation mechanism of the valve starter. The beverage faucet device comprises a removable flexible discharging tube, and the removable flexible discharging tube comprises a liquid valve fixedly connected to the valve receiving groove and coupled to the valve starter. The head portion is removably mounted to a locking mechanism of the faucet housing. The removable flexible discharging tube comprises an attached surface adjacent to the liquid valve, and the beverage faucet device comprises a receiving mechanism disposed on the head portion or the beverage faucet device. The receiving mechanism abuts the attached surface of the removable flexible discharging tube when the liquid valve is fixedly connected to the valve receiving groove, and the head portion is mounted to the faucet housing. The receiving mechanism is disposed on the faucet housing.

BRIEF SUMMARY OF THE DISCLOSURE

The present disclosure provides a faucet device with a self-cleaning function and a method of supplying a beverage therefrom to solve the deficiencies in the background.

In order to solve the technical problem, a first technical solution of the present disclosure is as follows.

A faucet device with a self-cleaning function comprises a faucet mechanism, a control mechanism, a self-cleaning mechanism, and a beverage inlet passage. The beverage inlet passage is configured to be in communication with a beverage source. The faucet mechanism comprises a first passage configured to be in communication with a water source and a second passage configured to be in communication with the beverage source. The control mechanism is connected to an inlet of the second passage, the beverage inlet passage, and the self-cleaning mechanism to control the beverage inlet passage to supply a beverage supplied by the beverage source to the second passage or to enable the second passage to be cleaned by the self-cleaning mechanism.

In a preferred embodiment, the self-cleaning mechanism comprises an air supply mechanism configured to supply a cleaning air, and the control mechanism is connected to the inlet of the second passage, the beverage inlet passage, and the air supply mechanism to control the air supply mechanism to supply the cleaning air to the second passage to clean the second passage.

In a preferred embodiment, the self-cleaning mechanism comprises a cleaning liquid inlet passage configured to be in communication with a cleaning liquid source, and the control mechanism is connected to the inlet of the second passage, the beverage inlet passage, and the cleaning liquid inlet passage to control the cleaning liquid inlet passage to supply a cleaning liquid supplied by the cleaning liquid source to the second passage to clean the second passage.

In a preferred embodiment, the self-cleaning mechanism comprises an air supply mechanism configured to supply a cleaning air and a cleaning liquid inlet passage configured to be in communication with a cleaning liquid source, and the control mechanism is connected to the inlet of the second passage, the beverage inlet passage, the air supply mechanism, and the cleaning liquid inlet passage to control the beverage inlet passage to supply the beverage to the second passage, the air supply mechanism to supply the cleaning air to the second passage, or the cleaning liquid inlet passage to supply a cleaning liquid supplied by the cleaning liquid source to the second passage, so as to enable the second passage to be cleaned by the cleaning air supplied by the air supply mechanism or by the cleaning liquid supplied by the cleaning liquid inlet passage.

In a preferred embodiment, the faucet mechanism comprises a switch mechanism, and the switch mechanism is connected to the first passage to control characteristics of water supplied by the water source.

In a preferred embodiment, the control mechanism is disposed in a box body. The box body is disposed with a second passage port, a beverage port, and a cleaning liquid port. The second passage port is in communication with the inlet of the second passage. The beverage inlet passage comprises the beverage port. The cleaning liquid inlet passage comprises the cleaning liquid port. The air supply mechanism is in communication with the second passage port. The control mechanism is connected to the second passage port, the beverage port, and cleaning liquid port.

In a preferred embodiment, the control mechanism comprises a first on-off valve and a pump body, the first on-off valve is connected between the cleaning liquid port and the second passage port, and the pump body is connected between the beverage port and the second passage port.

In a preferred embodiment, the control mechanism further comprises a controller in electrical communication with the first on-off valve, the pump body, and the air supply mechanism.

In a preferred embodiment, the first passage comprises an inlet passage and an outlet passage, the box body is disposed with a water inlet and a water outlet, the inlet passage comprises the water inlet, and the outlet passage comprises the water outlet. The control mechanism further comprises a second on-off valve connected between the water inlet and the water outlet, and the controller is in electrical communication with the second on-off valve.

In a preferred embodiment, the control mechanism further comprises a controller, a first on-off valve, and a pump body. The first on-off valve is connected to the cleaning liquid inlet passage to control a turning ON and OFF of the cleaning liquid inlet passage. The pump body is connected to the beverage inlet passage to control whether the beverage is drawn from the beverage source. The controller is in electrical communication with the first on-off valve, the pump body, and the air supply mechanism.

In a preferred embodiment, the control mechanism comprises a second on-off valve, the first passage comprises an inlet passage and an outlet passage, the second on-off valve is connected between the inlet passage and the outlet passage, and the controller is in electrical communication with the second on-off valve.

In a preferred embodiment, the control mechanism comprises a switch unit connected to the beverage inlet passage, the cleaning liquid inlet passage, and the second passage.

In a preferred embodiment, the faucet mechanism comprises a faucet main body, the control mechanism is disposed with a control unit in electrical communication with the controller, and the control unit is disposed on the faucet main body.

In a preferred embodiment, the faucet mechanism comprises a faucet main body, the faucet main body comprises a mounting portion, and a valve body is disposed in the mounting portion. the switch mechanism comprises a valve core movably connected to the valve body and a handle connected to the valve core and driving the valve core to move, the handle is disposed on a first end of the mounting portion, and the control mechanism is disposed with a control unit configured to control the control mechanism and disposed on a second end of the mounting portion.

In a preferred embodiment, the first passage comprises an inlet passage and an outlet passage configured to be in communication with the inlet passage, and the faucet mechanism comprises a passage unit defining the outlet passage and second passage.

In a preferred embodiment, the passage unit has a pipe-in-pipe construction and comprises an inner pipe and an outer pipe, the inner pipe defines the second passage, and the outlet passage is defined between the inner pipe and the outer pipe.

In a preferred embodiment, the first passage comprises an inlet passage and an outlet passage configured to be in communication with the inlet passage, and the switch mechanism is connected to the inlet passage to control the characteristics of the water.

In a preferred embodiment, the inlet passage comprise a cold water pipe, a hot water pipe, and a mixing water pipe, the switch mechanism is connected to the cold water pipe, the hot water pipe, and the mixing water pipe, and a distal end of the mixing water pipe defines an outlet of the inlet passage.

In a preferred embodiment, the air supply mechanism comprises an air pump, and the cleaning liquid is purified water.

A second technical solution of the present disclosure is as follows.

A faucet device with a self-cleaning function comprises a faucet mechanism, a control mechanism, an air supply mechanism, a beverage inlet passage, and a cleaning liquid inlet passage. The air supply mechanism is configured to supply a cleaning air, the beverage inlet passage is configured to be in communication with a beverage source, and the cleaning liquid inlet passage is configured to be in communication with a cleaning liquid source. The faucet mechanism comprises a first passage configured to be in communication with a water source and a second passage configured to be in communication with the beverage source. The control mechanism is connected to an inlet of the second passage, the beverage inlet passage, the air supply mechanism, and the cleaning liquid inlet passage to control the inlet of the second passage to be alternatively in communication with the beverage inlet passage, the air supply mechanism, or the cleaning liquid inlet passage, so as to enable the second passage to be supplied with a beverage supplied by the beverage inlet passage, be cleaned by the cleaning air supplied by the air supply mechanism, or cleaned by a cleaning liquid supplied by the cleaning liquid inlet passage.

In a preferred embodiment, the control mechanism comprises a switch unit connected to beverage inlet passage, the cleaning liquid inlet passage, the air supply mechanism, and the inlet of the second passage.

A third technical solution of the present disclosure is as follows.

A method of supplying the beverage using the faucet device with the self-cleaning function comprises a beverage supplying part, and a self-cleaning part. The beverage supplying part comprises: placing the second passage in communication with the beverage inlet passage, turning off the air supply mechanism and the cleaning liquid inlet passage, and supplying the beverage from the second passage. The self-cleaning part comprises a first cleaning method and a second cleaning method which is configured to be selected according to a setting or according to user control. The first cleaning method comprises: placing the second passage in communication with the air supply mechanism, turning off both the beverage inlet passage and the cleaning liquid inlet passage, supplying the cleaning air into the second passage by the air supply mechanism, and cleaning the second passage by the cleaning air. The second cleaning method comprises: a) placing the inlet of the second passage in communication with the cleaning liquid inlet passage, turning off both the air supply mechanism and the beverage inlet passage, supplying the cleaning liquid to second passage by the cleaning liquid inlet passage, and cleaning the second passage by the cleaning liquid; and b) placing the inlet of the second passage in communication with the air supply mechanism, turning off the beverage inlet passage and the cleaning liquid inlet passage, supplying the cleaning air to the second passage by the air supply mechanism, and cleaning the second passage by the cleaning air.

Compared with the existing techniques, the technical solution has the following advantages.

The second passage is cleaned by the self-cleaning mechanism to prevent growth of bacteria on the inner wall of the second passage. Due to the self-cleaning function, the second passage may be disposed on the faucet device, and the second passage does not need to be designed as to be detachable, which is simple in structure, convenient to use, and convenient to maintain. The faucet device discharges a beverage (e.g., a soft drink) and running water, so as to save the cost of buying a soft drink machine.

The second passage can be cleaned by cleaning air generated by the air supply mechanism to prevent the growth of bacteria on the inner wall of the second passage. The second passage can be cleaned by the cleaning liquid to prevent the growth of bacteria on the inner wall of the second passage. The second passage can be initially cleaned by the cleaning liquid and then cleaned by the cleaning air to discharge a residue of the cleaning liquid to prevent the growth of bacteria on the inner wall of the second passage.

The first passage configured to be in communication with water and the second passage configured to be in communication with the beverage are independent, which prevents the beverage from being polluted by ordinary water (e.g., running water) and makes the faucet device be reliable to use.

The faucet mechanism is disposed with a switch mechanism connected to the first passage to control characteristics of the water. The switch mechanism independently controls characteristics of the water, which is easy to control and matches a usage habit of user.

The second passage port is in communication with the inlet of second passage, and the beverage inlet passage comprises the beverage port. The control mechanism is connected to the second passage port, the beverage port, and the cleaning liquid port to achieve switching, and the air supply mechanism is in communication with the second passage port, which is simple in construction and easy to control.

The control mechanism comprises a first on-off valve and a pump body, and the control mechanism controls beverage supplying, an air self-cleaning, or a cleaning liquid self-cleaning by controlling the first on-off valve, the pump body, and the air supply mechanism, which is simple in construction and easy to control.

The second on-off valve is connected between the inlet passage and the outlet passage. The controller is in electrical communication with the second on-off valve to ensure that the running water cannot flow into the outlet passage when the beverage is being discharged, which means the outflow of the beverage is prioritized and avoids the beverage from being polluted.

The switch unit is connected to the beverage inlet passage, the cleaning liquid inlet passage, and the inlet of the second passage, which is simple in construction.

The control unit is disposed on the faucet main body, which is reasonable in layout and compact in construction.

The handle is disposed on one end of the mounting portion, and the control unit is disposed on the other end of the mounting portion, which is compact in construction and convenient for control by a user.

The passage unit defines the outlet passage and the second passage, which is simple and compact in construction.

The control mechanism is connected to the inlet of the second passage, the beverage inlet passage, the air supply mechanism, and the cleaning liquid inlet passage to control the inlet of the second passage to be alternatively in communication with at least one of the beverage inlet passage, the air supply mechanism, or the cleaning liquid inlet passage, which is simple in construction.

Figure 1:
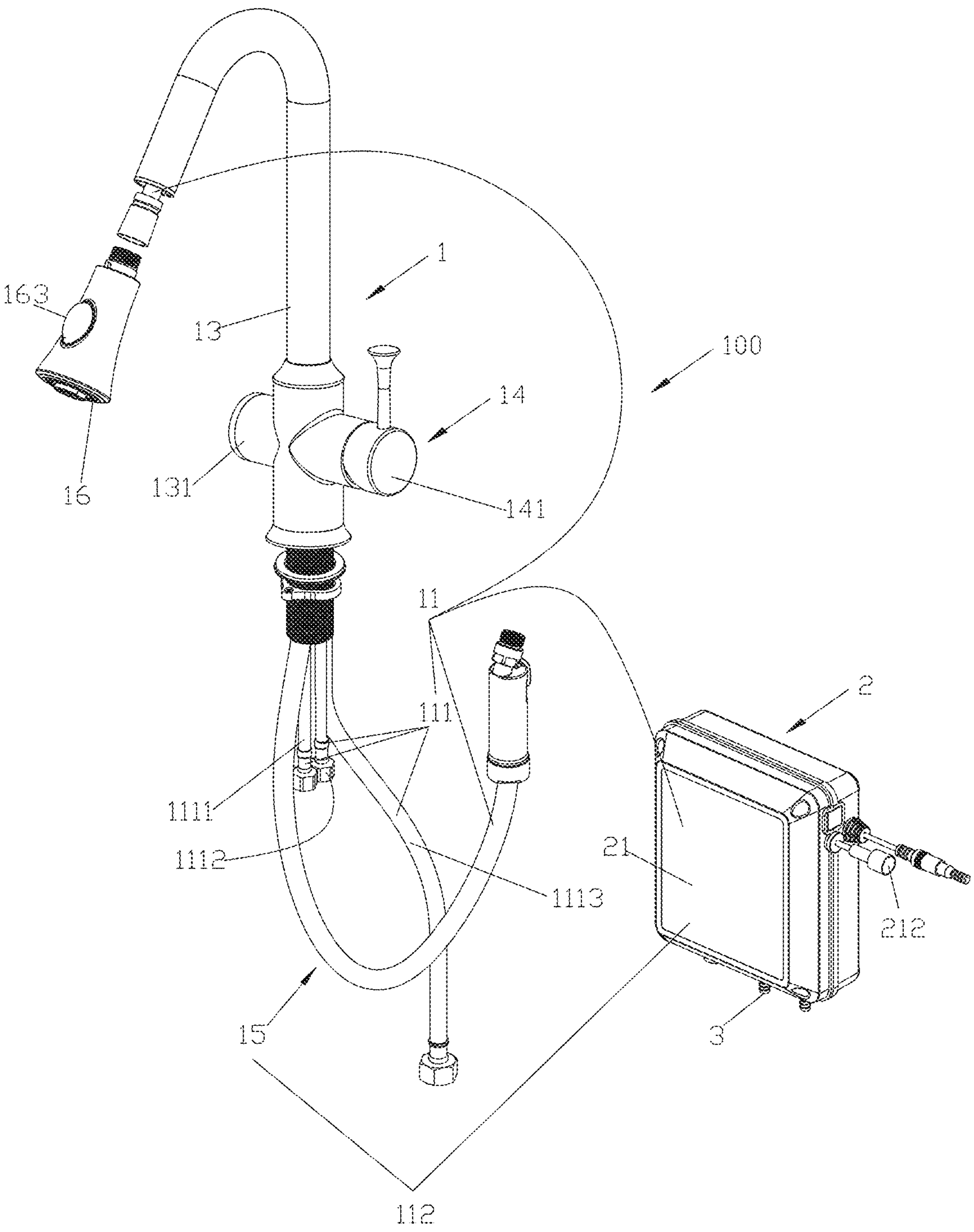
FIG. 1 illustrates an exploded perspective view of a faucet device according to an embodiment.
Figure 2:
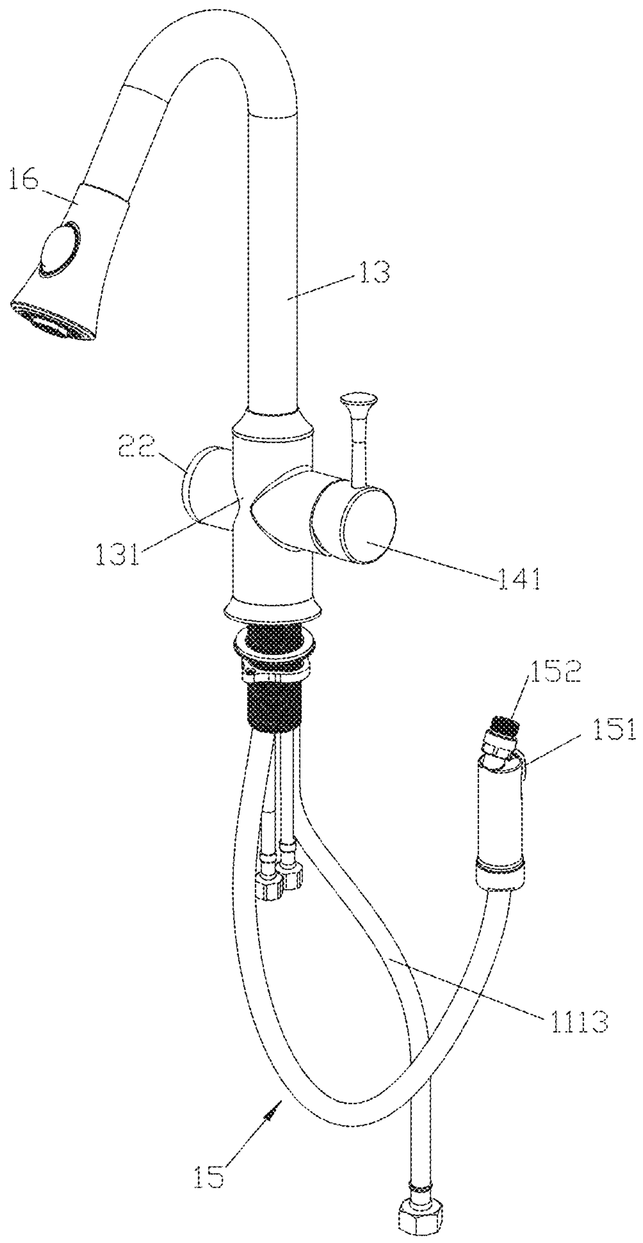
FIG. 2 illustrates a perspective view of the faucet mechanism according to the embodiment.
Figure 3:
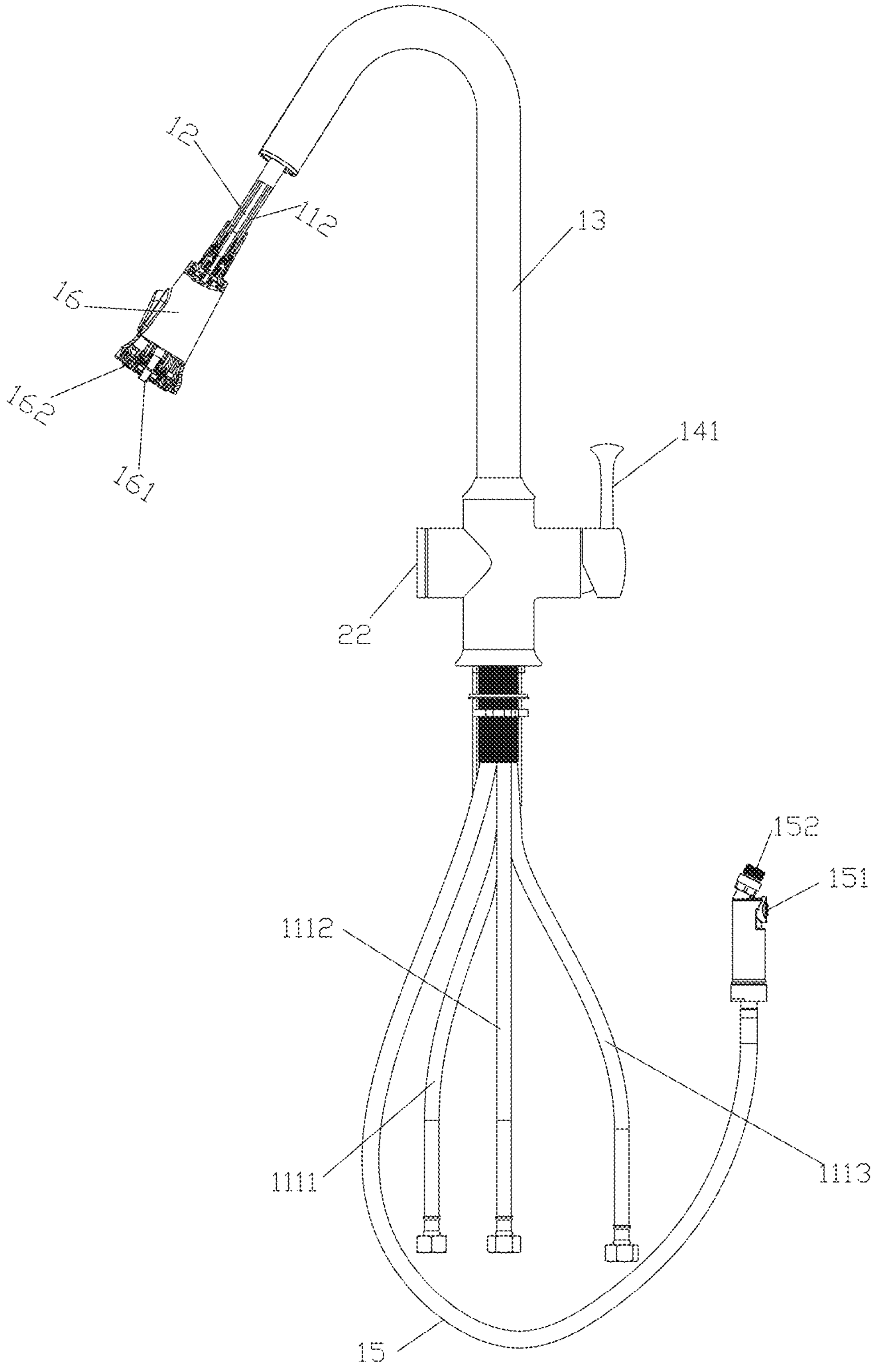
FIG. 3 illustrates a front view of the faucet mechanism according to the embodiment.
Figure 4:
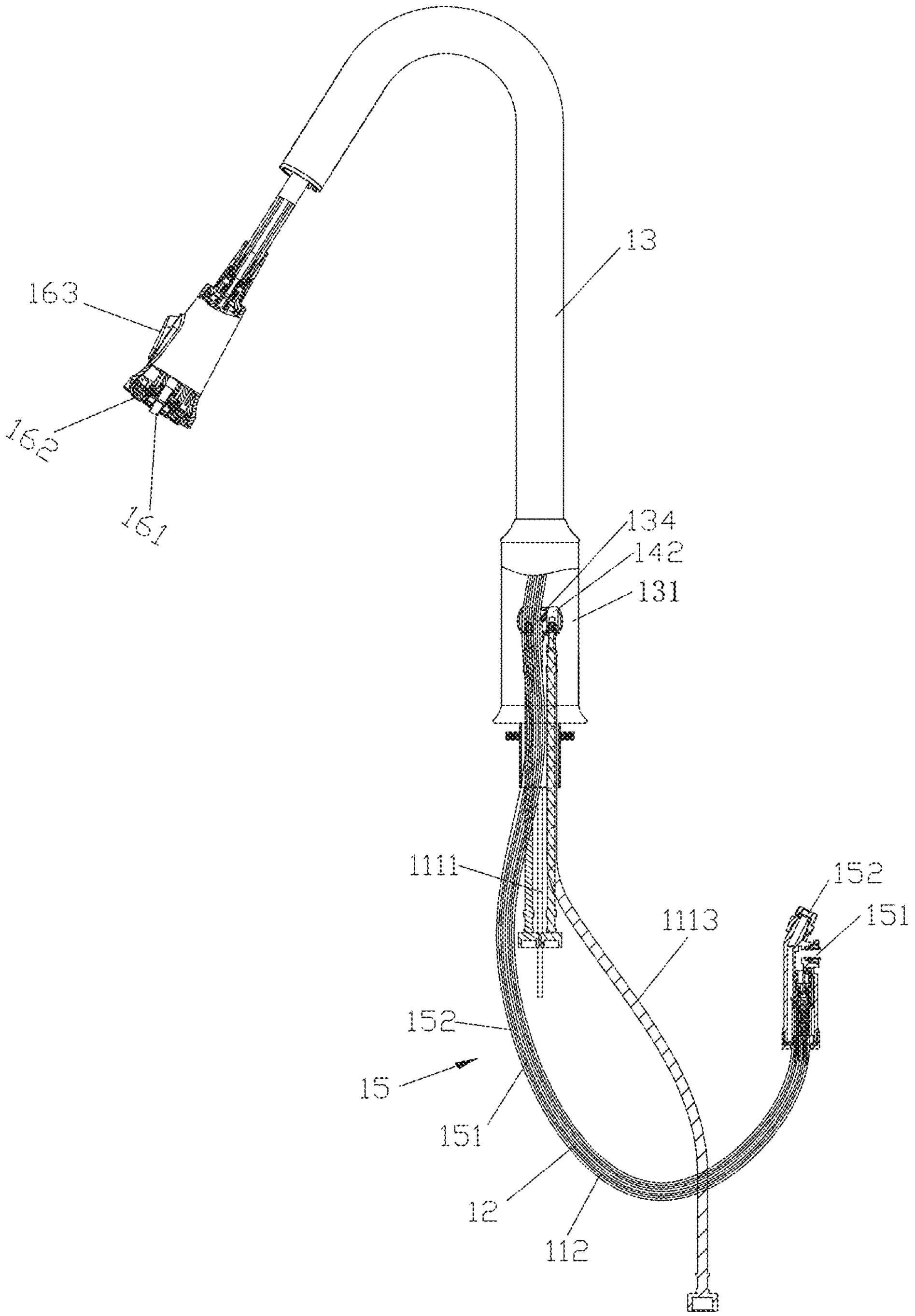
FIG. 4 illustrates a cross-sectional view of the faucet mechanism according to the embodiment.
Figure 5:
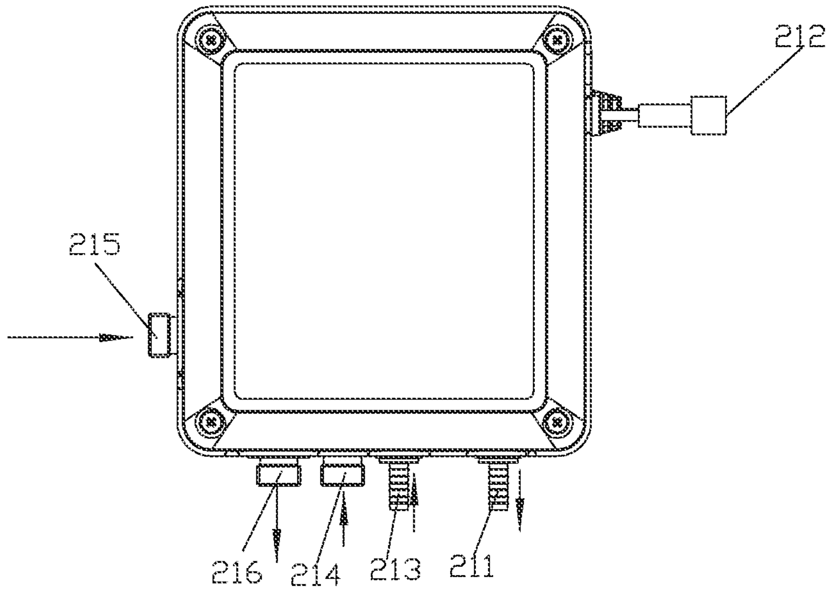
FIG. 5 illustrates a front view of a control mechanism according to the embodiment.
Figure 6:
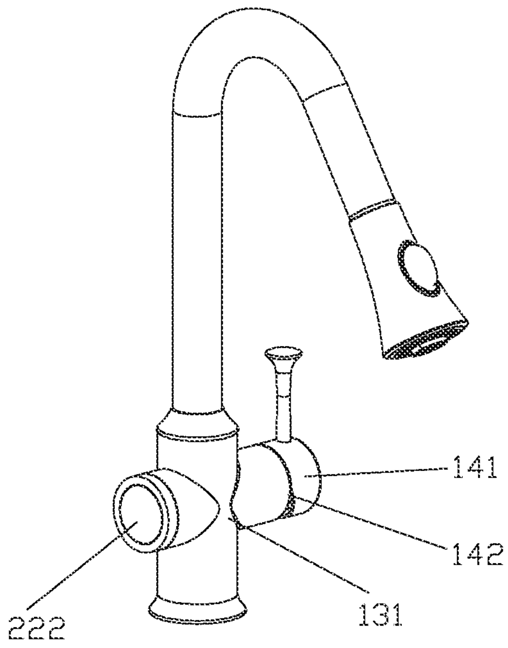
FIG. 6 illustrates a perspective view of a faucet main body according to the embodiment.
Figure 7:
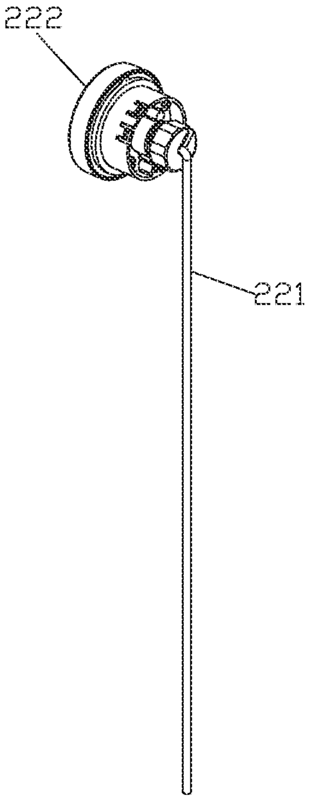
FIG. 7 illustrates a perspective view of a switch mechanism of a control unit according to the embodiment.

Description of symbols: faucet device 100, faucet mechanism 1, control mechanism 2, beverage inlet passage 3, cleaning liquid inlet passage 4, air supply mechanism 5, self-cleaning mechanism 6, first passage 11, inlet passage 111, outlet passage 112, cold water pipe 1111, hot water pipe 1112, mixing water pipe 1113, second passage 12, faucet main body 13, mounting portion 131, valve body 134, switch mechanism 14, handle 141, valve core 142, passage unit 15, inner pipe 151, outer pipe 152, liquid outlet mechanism 16, beverage outlet port 161, water outlet port 162, switch unit 163, box body 21, second passage port 211, first check valve 212, beverage port 213, cleaning liquid port 214, water inlet 215, water outlet 216, second check valve 217, flow sensor 218, third check valve 219, control unit 22, signal line 221, push button 222, first on-off valve 23, pump body 24, controller 25, second on-off valve 26.

DETAILED DESCRIPTION OF THE EMBODIMENTS

The present disclosure will be further described below in combination with the accompanying drawings and embodiments.

Referring to FIGS. 1-13, a faucet device 100 with a self-cleaning function is provided. The faucet device 100 comprises a faucet mechanism 1, a control mechanism 2, an air supply mechanism 5 configured to supply a cleaning air, a beverage inlet passage 3 configured to be in communication with a beverage source, and a cleaning liquid inlet passage 4 configured to be in communication with a cleaning liquid source. The air supply mechanism 5 comprises, if needed, an air pump configured to compress air to generate the cleaning air and a disinfection device configured to disinfect not-compressed air. In some embodiments, the air pump is configured to compress other gases (i.e., an inert gas, etc.) to generate the cleaning air. The beverage source supplies a beverage such as beer, fruit juice, a soft drink, or purified water, and the cleaning liquid source supplies a cleaning liquid such as purified water or ordinary water according to needs. When the cleaning liquid source supplies purified water, the cleaning liquid source is a water source with a water filter or is a bucket of purified water. That is, the faucet device 100 comprises a self-cleaning mechanism 6 (i.e., the air supply mechanism 5 and the cleaning liquid inlet passage 4).

The faucet device 100 comprises a first passage 11 in communication with a water source and a second passage 12 in communication with the beverage source, and the first passage 11 comprises an inlet passage 111 and an outlet passage 112.

Figure 13:
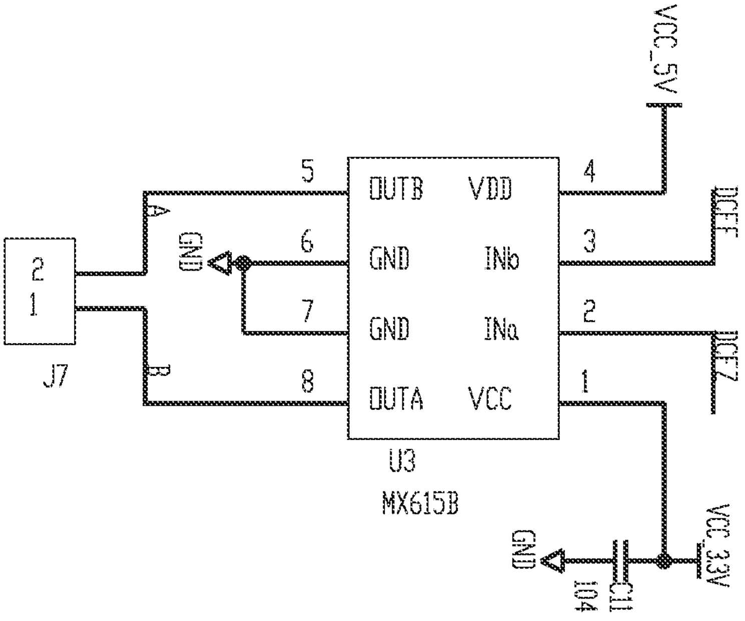
FIG. 13 illustrates a circuit diagram of a solenoid valve according to the embodiment.

The control mechanism 2 and the air supply mechanism 5 are disposed in a box body 21, and the box body 21 comprises an opening extending therethrough for enabling air to flow into the box body 21. The box body 21 is disposed with a second passage port 211 in communication with an inlet of the second passage 12 and the air pump of the air supply mechanism 5, a beverage port 213, and a cleaning liquid port 214. The beverage inlet passage 3 comprises the beverage port 213, and the cleaning liquid inlet passage 4 comprises the cleaning liquid port 214. A first on-off valve 23 is disposed and connected between the cleaning liquid port 214 and the second passage port 211, and a pump body 24, such as a water pump, is disposed and connected between the beverage port 213 and the second passage port 211. The control mechanism 2 comprises a controller 25, the pump body 24, and the first on-off valve 23. The controller 25 is in electrical communication with the first on-off valve 23, the pump body 24, and the air supply mechanism 5 so as to control a turning ON and OFF of the first on-off valve 23, control a turning ON and OFF of the pump body 24 to control whether to draw the beverage from the beverage source, and control a turning ON and OFF of the air supply mechanism 5 to control whether to supply air. Through the above-mentioned control, the faucet device 100 is able to select the beverage, the cleaning air, or the cleaning liquid. The box body 21 further is disposed with a water inlet 215 and a water outlet 216. A second on-off valve 26 is disposed and connected between the water inlet 215 and the water outlet 216 to control a turning ON and OFF of water between the inlet passage 111 and the outlet passage 112. The control mechanism 2 comprises the second on-off valve 26, and the controller 25 is in electrical communication with the second on-off valve 26. The second on-off valve 26 turns OFF when any one of the first on-off valve 23, the pump body 24, or the air pump of the air supply mechanism 5 turns ON. The control mechanism 2 further comprises a control unit 22 in electrical communication with the controller 25 carried over a signal line 221 or carried over wireless connection as required. The control unit 22 is operated to send an instruction signal to the controller 25, and the controller 25 receives the instruction signal and controls the turning ON and OFF of the first on-off valve 23, the second on-off valve 26, the air pump of the air supply mechanism 5, and the pump body 24. If both the first on-off valve 23 and the second on-off valve 26 are solenoid valves, the first on-off valve 23 and the second on-off valve 26 can be controlled as long as the controller 25 sends power-on/off signals to the first on-off valve 23 and the second on-off valve 26. This technology can refer to the prior art. Those of ordinary skill in the art can control the turning ON and OFF of the first on-off valve 23 and the second on-off valve 26 and the turning ON and OFF of the air pump of the air supply mechanism 5 and the pump body 24 according to the above-mentioned requirements. In the example embodiment, with reference to FIG. 12, the controller 25 comprises a PI6F18324 chip and a supporting circuit of the PI6F18324 chip. Referring to FIG. 13, each of the solenoid valves (i.e., the first on-off valve 23 and the second on-off valve 26) comprise a MX615B chip and a supporting circuit of the MX615B chip. According to needs, other structures can also be implemented, such as interconnected switches, which control the turning ON-OFF of the first on-off valve 23, the second on-off valve 26, the air pump of the air supply mechanism 5, and the pump body 24.

According to needs, a first check valve 212 is disposed and connected between the first on-off valve 23 and the second passage port 211. The air supply mechanism 5 and the beverage inlet passage 3 converge at a confluence connected to second passage port 211, and a second check valve 217 is disposed and connected between the confluence and the second passage port 211. A third check valve 219 and a flow sensor 218 are disposed and connected between the water inlet 215 and water outlet 216. The water inlet 215, the flow sensor 218, the second on-off valve 26, the third check valve 219, and the water outlet 216 are connected in sequence, and the controller 25 is in electrical communication with the flow sensor 218.

The faucet mechanism 1 comprises a faucet main body 13 and switch mechanism 14 disposed in the faucet main body 13. The switch mechanism 14 is connected to the inlet passage 111 of the first passage 11 to control characteristics of the water. In the example embodiment, the faucet main body 13 comprises a mounting portion 131, and a valve body 134 is disposed in the mounting portion 131. The switch mechanism 14 comprises a valve core 142 movably connected (e.g., rotatably connected) to the valve body 134 and a handle 141 fixedly connected to and driving the valve core 142 to move. The handle 141 is disposed on one end of the mounting portion 131. The inlet passage 111 comprises a cold water pipe 1111, a hot water pipe 1112, and a mixing water pipe 1113. A distal end of the mixing water pipe 1113 defines an outlet of the inlet passage 111. An inlet of the switch mechanism 14 is connected to the cold water pipe 1111 and the hot water pipe 1112, and an outlet of the switch mechanism 14 is connected to the mixing water pipe 1113 to control characteristics of the water (i.e., regulation of temperature, turning ON and OFF of the water, or regulation of flow). Alternatively, the switch mechanism 14 is only connected to one of the cold water pipe 1111 or the hot water pipe 1112 to control characteristics of the water (i.e., turning ON and OFF of the water or regulation of flow). The switch mechanism 14 may refer to the prior art. The control unit 22 is disposed on the other end of the mounting portion 131 and comprises a push button 222 and a button panel coupled to the push button 222 and connected to the controller 25. In this embodiment, the push button 222 generates a first control signal corresponding to a short stroke length of the push button 222 and a second control signal corresponding to a long stroke length of the push button 222. According to needs, two push buttons 222 can also be used. When the two push buttons 222 are pressed, the first control signal and the second control signal are generated respectively. Regarding the push button 222 and the button panel, it can refer to the prior art. According to needs, the control unit 22 can set corresponding lights to prompt function status.

In this embodiment, the faucet mechanism 1 comprises a passage unit 15, and the passage unit 15 comprises the outlet passage 112 and the second passage 12. Specifically, the passage unit 15 has a pipe-in-pipe construction and comprises an inner pipe 151 and an outer pipe 152. The inner pipe defines the second passage 12, and the outlet passage 112 is defined between the inner pipe 151 and the outer pipe 152. The passage unit 15 passes through the faucet main body 13, and an outlet of the passage unit 15 is mounted with a liquid outlet mechanism 16 (e.g., a shower head). The liquid outlet mechanism 16 comprises a beverage outlet port 161 in communication with the second passage 12 and a water outlet port 162 in communication with the first passage 11. The water outlet port 162 has two water outlet functions and comprises a switch unit 163 in communication with the outlet passage 112 of the first passage 11, and the switch unit 163 is configured to switch the two water outlet functions of the water outlet port 162 to discharge the water. Furthermore, the passage unit 15 is made of a flexible material to bend.

The first control signal is generated by the control unit 22, which is controlled by a user. The controller 25 receives the first control signal and controls the pump body 24 to be turned on and controls the first on-off valve 23, the second on-off valve 26, and the air pump of the air supply mechanism 5 to be turned off. The pump body 24 draws the beverage from the beverage source, and the beverage passes through the second passage 12 and is discharged from the beverage outlet port 161. When the controller 25 receives the first control signal again, the controller 25 controls the pump body 24 to be turned off (the beverage stops being supplied), the air pump of the air supply mechanism 5 to be turned on automatically, and the pump body 24, the first on-off valve 23, and the second on-off valve 26 to be turned off. The air supply mechanism 5 supplies the cleaning air to clean the second passage 12. The second control signal (to enable a deep self-cleaning) is generated by the control unit 22, which is controlled by a user. The controller 25 receives the second control signal and firstly controls the first on-off valve 23 to be turned on and controls the pump body 24, the second on-off valve 26, and the air pump of the air supply mechanism 5 to be turned off, and the second passage 12 is cleaned by the cleaning liquid supplied by the cleaning liquid inlet passage 4. Then, the controller 25 controls the air pump of the of the air supply mechanism 5 to be turned on and controls the first on-off valve 23, the second on-off valve 26, and the pump body 24 to be turned off, and the second passage 12 is cleaned by the cleaning air supplied by the air supply mechanism 5. In this embodiment, the controller 25 is controlled by a single push button 222, the first control signal is generated by pushing the short stroke length of the push button 222 to control whether the beverage is discharged, and the second control signal is generated by pushing the long stroke length of the push button 222 to control whether to the deep self-cleaning is performed. According to needs, two push buttons 222 can also be used as described above. One of the two push buttons 222 is pushed to generate the first control signal, and the other one of the two push buttons 222 is pushed to generate the second control signal. Alternatively, three push buttons 222 can be used. A first push button 222 of the three push buttons 222 is pushed to determine to discharge the beverage, a second push button 222 of the three push buttons 222 is pushed to determine to stop discharging the beverage, and a third push button 222 of the three push buttons 222 is pushed to determine whether to perform the deep self-cleaning.

When the water flows through the first passage 11, the water sequentially flows into the cold water pipe 1111, the hot water pipe 1112, and the switch mechanism 14, then flows out of the mixing water pipe 1113, then flows into the water inlet 215 and the water outlet 216, then flows into the outlet passage 112. The cold water pipe 1111, the hot water pipe 1112, the switch mechanism 14, the mixing water pipe 1113, and the water inlet 215 define the inlet passage 111, and the outlet passage 112 comprises the water outlet 216.

A method of supplying the beverage of the faucet device 100 with the self-cleaning function and comprising a beverage supplying part and a self-cleaning part is described below.

During the beverage supplying part of the method, the second passage 12 is in communication with the beverage inlet passage 3, and the air supply mechanism 5 and cleaning liquid inlet passage 4 are turned off. The beverage passes through the second passage 12 and is discharged.

During the self-cleaning part of the method, a first cleaning method and a second cleaning method is selected according to a setting or according to user control.

The first cleaning method is as follows. The second passage 12 is in communication with the air supply mechanism 5, the beverage inlet passage 3 and the cleaning liquid inlet passage 4 are both turned off, and the air supply mechanism 5 supplies the cleaning air into the second passage 12 to clean the second passage 12.

The second cleaning method comprises the following steps: a) placing the inlet of the second passage 12 in communication with the cleaning liquid inlet passage 4, turning off the air supply mechanism 5 and the beverage inlet passage 3, supplying the cleaning liquid to the second passage 12 through the cleaning liquid inlet passage 4, and cleaning the second passage 12 using the cleaning liquid; and b) placing the inlet of the second passage 12 in communication with the air supply mechanism 5, turning off the beverage inlet passage 3 and the cleaning liquid inlet passage 4, supplying the cleaning air to the second passage 12 through the air supply mechanism 5, and cleaning the second passage 12 using the cleaning air.

In this embodiment, the method of supplying the beverage further comprises: receiving the first control signal by the controller 25, turning on the pump body 24, turning off the first on-off valve 23, the second on-off valve 26, and the air pump of the air supply mechanism 5, and discharging the beverage passing through the second passage 12 and the beverage outlet port 161: receiving the first control signal again by the controller 25, turning off the pump body 24 by the controller 25, and then implementing the first cleaning method; and when receiving the second control signal by the controller 25, implementing the second cleaning method.

By way of example, three working processes of the faucet device 100 with self-cleaning function in this embodiment are as follows, and the three working processes can be independently performed.

Figure 8:
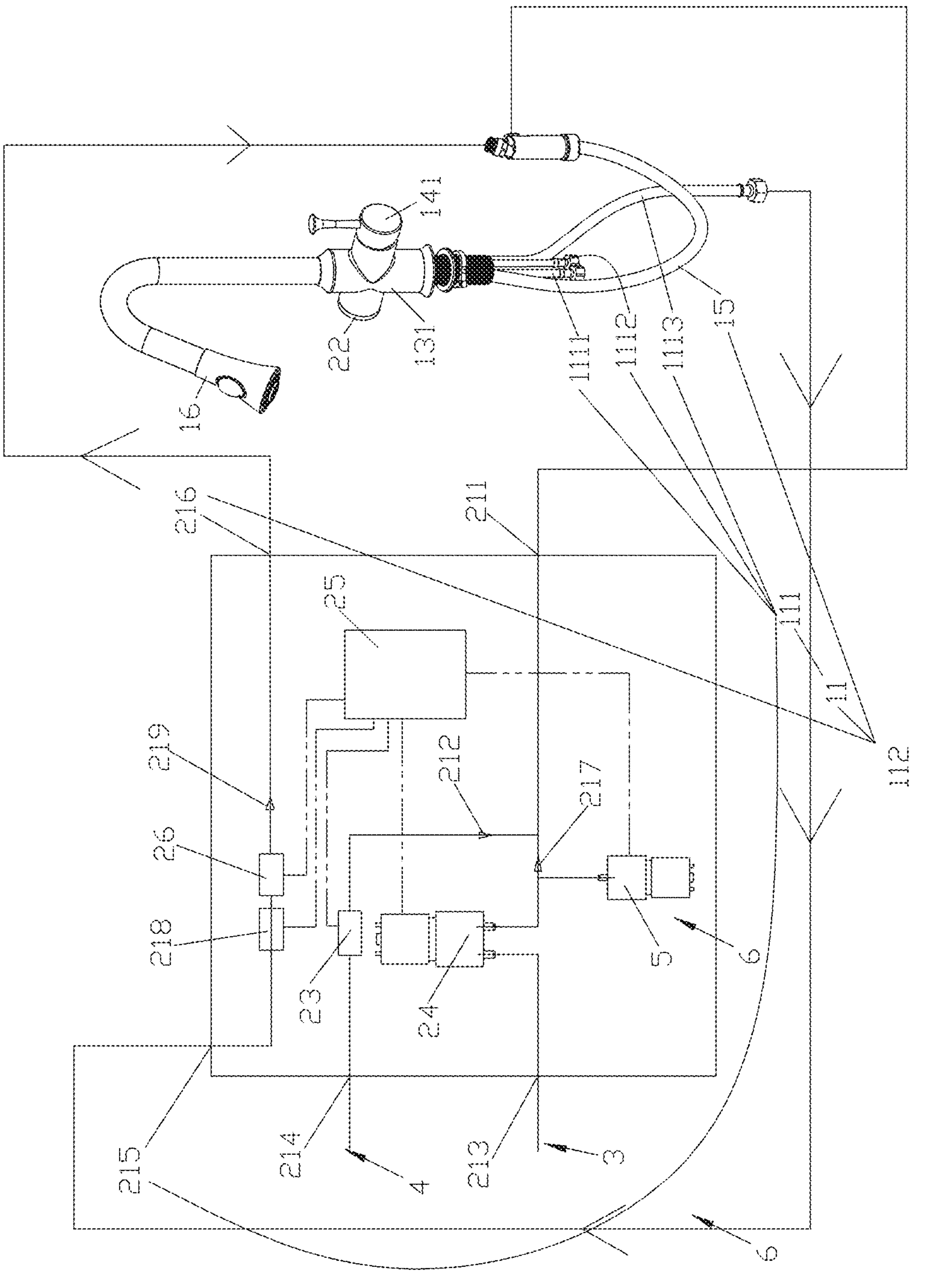
FIG. 8 illustrates a schematic of the faucet device according to the embodiment when the faucet device is discharging ordinary water.
Figure 9:
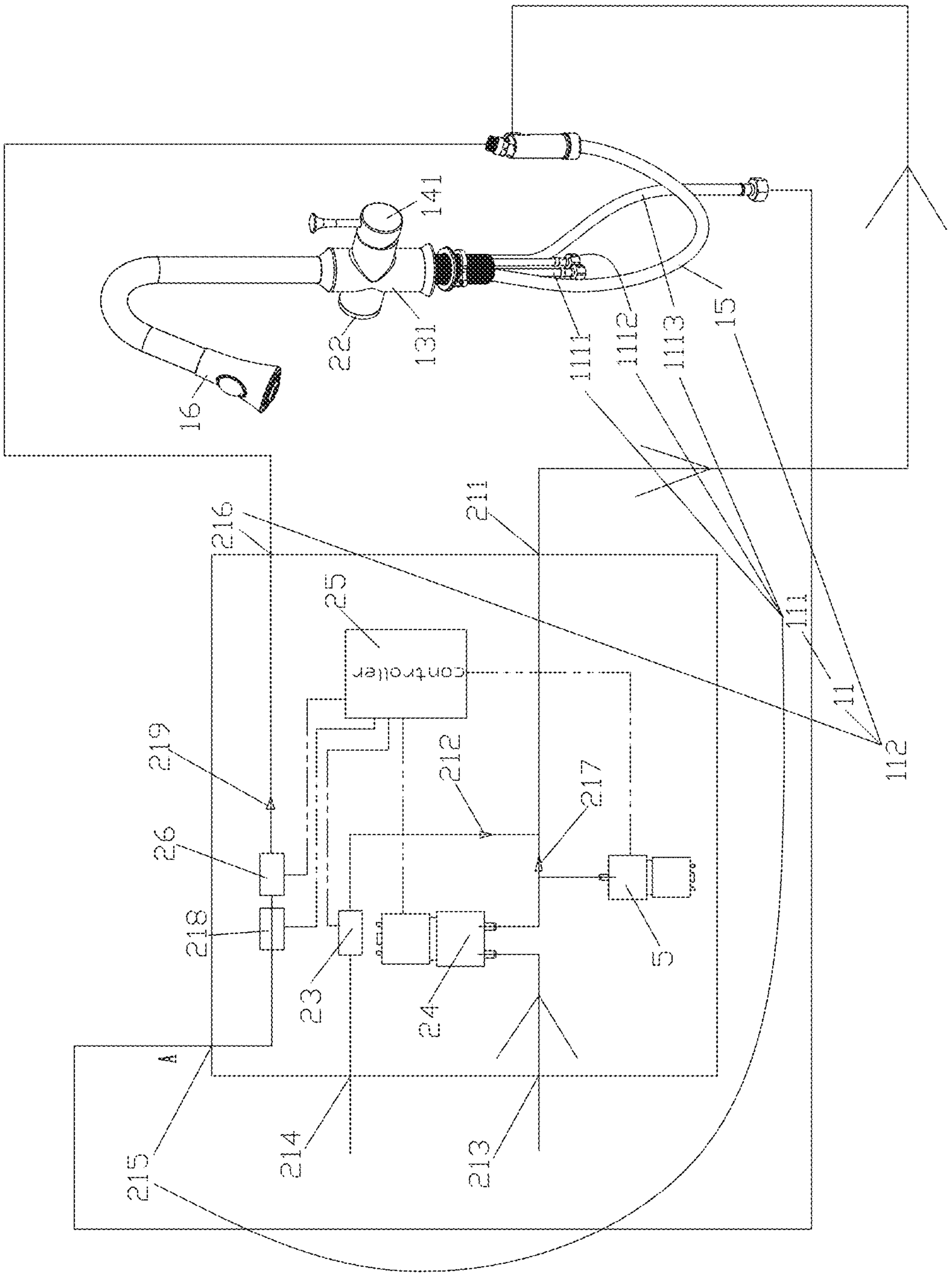
FIG. 9 illustrates a schematic of the faucet device according to the embodiment when the faucet device is discharging a beverage.
Figure 10:
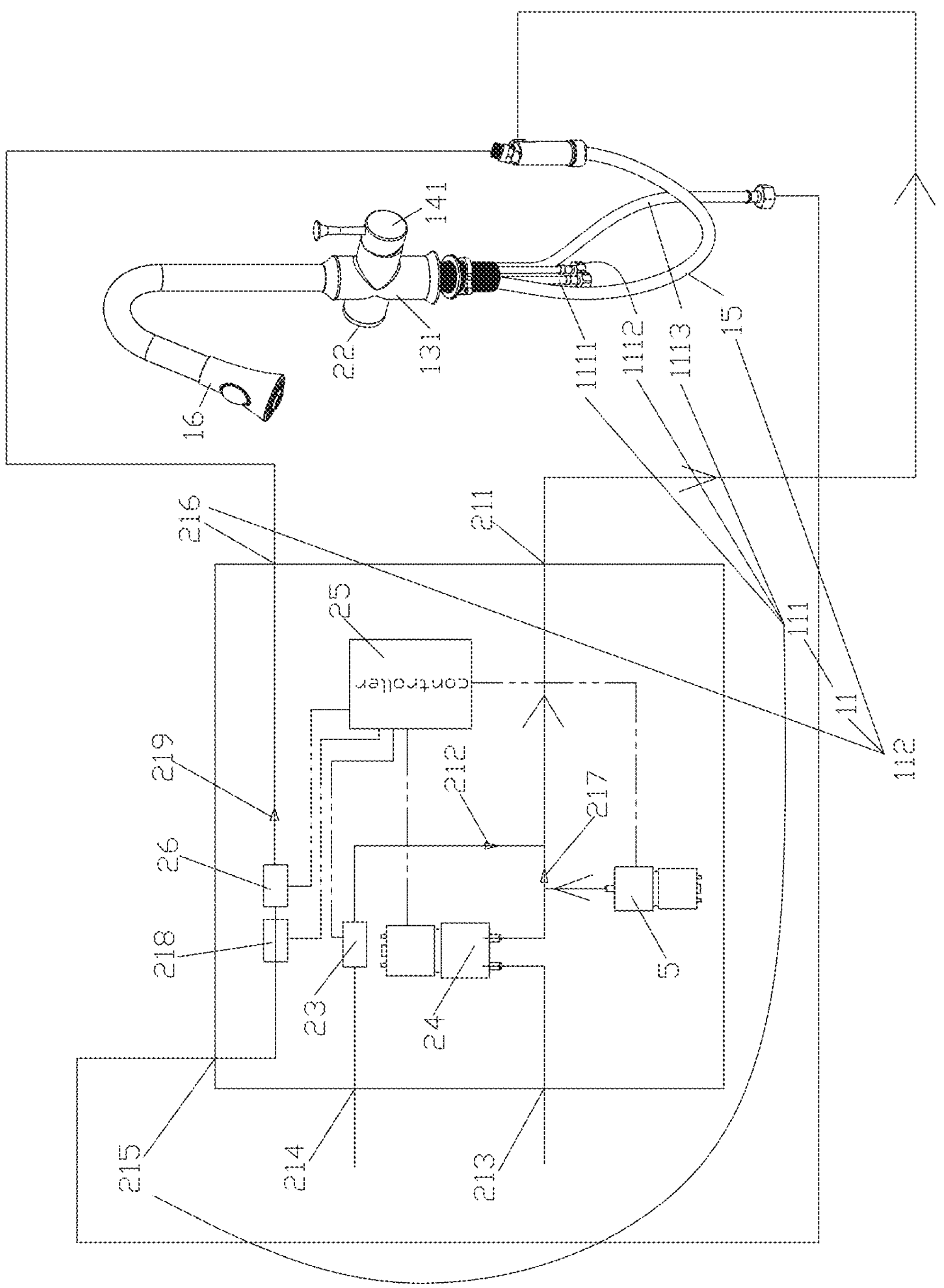
FIG. 10 illustrates a schematic of the faucet device according to the embodiment when air self-cleaning is being performed.
Figure 11:
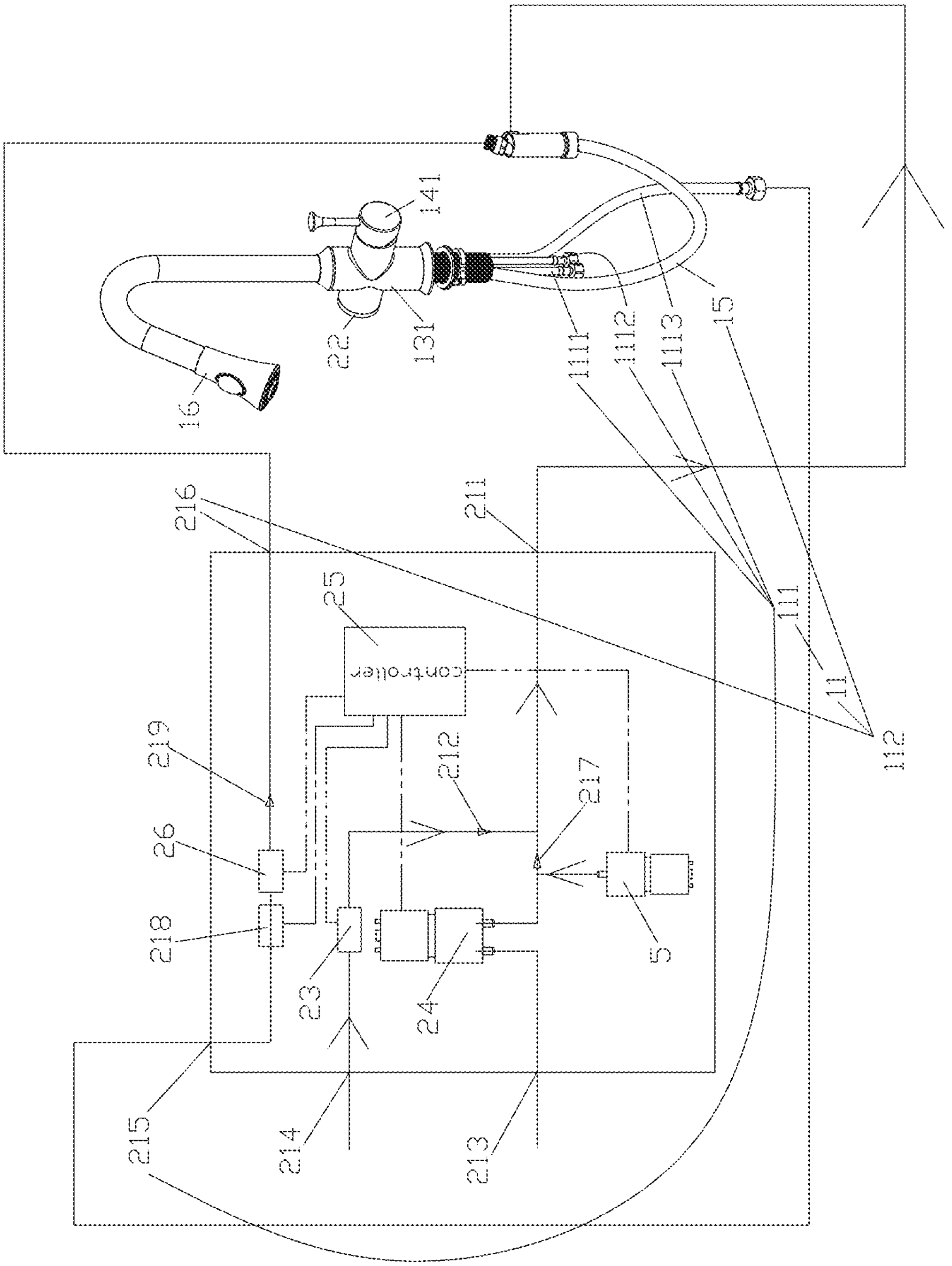
FIG. 11 illustrates a schematic of the faucet device according to the embodiment when a cleaning liquid self-cleaning is being performed.
Figure 12:
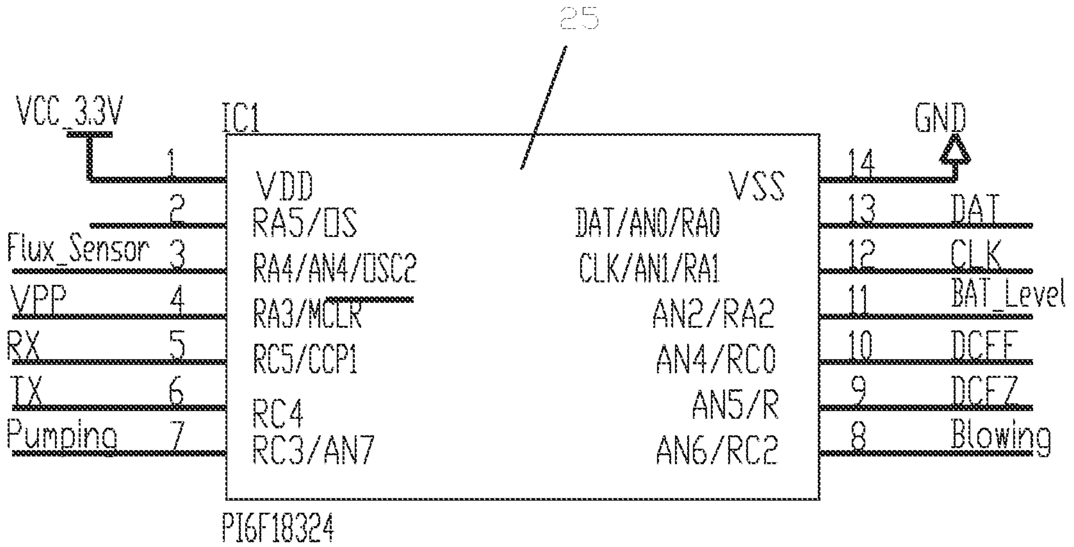
FIG. 12 illustrates a circuit diagram of a controller according to the embodiment.

In a first working process: referring to FIG. 8, the handle 141 of the switch mechanism 14 operated and a first water outlet function (e.g., aerator) of the liquid outlet mechanism 16 is implemented or a second water outlet function (e.g., shower water) is implemented by pushing the switch unit 163 of the liquid outlet mechanism 16 to discharge ordinary water (e.g., mixing water of cold water and hot water).

In a second working process: the push button 222 is pushed according to the short stroke length to enable the liquid outlet mechanism 16 to discharge the beverage (when discharging the beverage, the ordinary water cannot be supplied). The push button 222 is pushed again to stop the discharge of the beverage. When the beverage is not being discharged, the cleaning function is automatically turned on, the air pump of the air supply mechanism 5 is turned on, and cleaning air is blown through the second passage 12 to push out a residue in the second passage 12 to realize the self-cleaning function.

In a third working process: the push button 222 is pushed according to the long stroke length to enable the cleaning liquid (e.g., purified water) to enter and clean the second passage 12. After the cleaning liquid as flowed for a specified flowing time (e.g., 10 seconds), the cleaning liquid stops flowing in the second passage 12, and the air pump of the air supply mechanism 5 is turned on to blow the cleaning air into the second passage 12 to remove the remaining cleaning liquid (i.e., purified water) and realize the deep self-cleaning function.

Another embodiment is similar to the last embodiment, but has the differences described below. A plurality of the first on-off valves 23 is disposed and connected between each of a port of the air supply mechanism 5, the beverage port 213, and the cleaning liquid port 214, and the second passage port 211. Through a turning ON and OFF of each of the plurality of first on-off valves 23, the faucet device 100 is selected for beverage supplying, air self-cleaning, or cleaning liquid self-cleaning.

Another embodiment is similar to the last embodiment, but has the differences described below. The control mechanism 2 comprises a switching mechanism that is connected to the air supply mechanism 5, the beverage port 213, the cleaning liquid port 214, and the second passage port 211 to enable the faucet device 100 to be selected to for beverage supplying, air self-cleaning, or cleaning liquid self-cleaning.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A faucet device with a self-cleaning function, comprising:

a faucet mechanism, a control mechanism, a self-cleaning mechanism, and a beverage inlet passage, wherein:

the beverage inlet passage is configured such that the beverage inlet passage receives a beverage, the faucet mechanism comprises a first passage through which water is supplied and a second passage through which the beverage is supplied, the control mechanism is connected to an inlet of the second passage, the beverage inlet passage, and the self-cleaning mechanism, the control mechanism controls the beverage inlet passage such that the beverage inlet passage supplies the beverage to the second passage or cleans the second passage by the self-cleaning mechanism, the self-cleaning mechanism comprises an air supply mechanism configured such that cleaning air is supplied and a cleaning liquid inlet passage configured such that cleaning liquid is supplied, the control mechanism is connected to the inlet of the second passage, the beverage inlet passage, the air supply mechanism, and the cleaning liquid inlet passage, the control mechanism controls the beverage inlet passage such that the beverage inlet passage supplies the beverage to the second passage, controls the air supply mechanism such that the air supply mechanism supplies the cleaning air to the second passage, or controls the cleaning liquid inlet passage such that the cleaning liquid inlet passage supplies the cleaning liquid to the second passage, thereby cleaning the second passage by the cleaning air supplied by the air supply mechanism or by the cleaning liquid supplied by the cleaning liquid inlet passage, the control mechanism is disposed in a box body, the box body is disposed with a second passage port, a beverage port, and a cleaning liquid port, the second passage port is in communication with the inlet of the second passage, the beverage inlet passage comprises the beverage port, the cleaning liquid inlet passage comprises the cleaning liquid port, the air supply mechanism is in communication with the second passage port, the control mechanism is connected to the second passage port, the beverage port, and cleaning liquid port, the control mechanism comprises a first on-off valve and a pump body, the first on-off valve is connected between the cleaning liquid port and the second passage port, and the pump body is connected between the beverage port and the second passage port.

2. The faucet device with the self-cleaning function according to claim 1, wherein:

the faucet mechanism further comprises a switch mechanism, and the switch mechanism is connected to the first passage for controlling characteristics of the water.

3. The faucet device with the self-cleaning function according to claim 2, wherein:

the first passage comprises an inlet passage and an outlet passage in communication with the inlet passage, and the switch mechanism is connected to the inlet passage for controlling the characteristics of the water.

4. The faucet device with the self-cleaning function according to claim 3, wherein:

the inlet passage comprise a cold water pipe, a hot water pipe, and a mixing water pipe, the switch mechanism is connected to the cold water pipe, the hot water pipe, and the mixing water pipe, and a distal end of the mixing water pipe defines an outlet of the inlet passage.

5. The faucet device with the self-cleaning function according to claim 2, wherein:

the faucet mechanism further comprises a faucet main body, the faucet main body comprises a mounting portion, a valve is disposed in the mounting portion, the switch mechanism comprises a handle connected to the valve, the handle is disposed on a first end of the mounting portion, and the control mechanism is disposed with a control unit such that the control unit controls the control mechanism and disposed on a second end of the mounting portion.

6. The faucet device with the self-cleaning function according to claim 1, wherein:

the control mechanism further comprises a controller in electrical communication with the first on-off valve, the pump body, and the air supply mechanism.

7. The faucet device with the self-cleaning function according to claim 6, wherein:

the first passage comprises an inlet passage and an outlet passage, the box body comprises a water inlet and a water outlet, the inlet passage is in communication with the water inlet, the outlet passage is in communication with the water outlet, the control mechanism further comprises a second on-off valve connected between the water inlet and the water outlet, and the controller is in electrical communication with the second on-off valve.

8. The faucet device with the self-cleaning function according to claim 6, wherein:

the faucet mechanism further comprises a faucet main body, the control mechanism is disposed with a control unit in electrical communication with the controller, and the control unit is disposed on the faucet main body.

9. The faucet device with the self-cleaning function according to claim 1, wherein:

the control mechanism further comprises a controller, the first on-off valve is connected to the cleaning liquid inlet passage such that the first on-off valve controls a turning ON and OFF of the cleaning liquid inlet passage, the pump body is connected to the beverage inlet passage such that the pump body controls whether the beverage is drawn, and the controller is in electrical communication with the first on-off valve, the pump body, and the air supply mechanism.

10. The faucet device with the self-cleaning function according to claim 9, wherein:

the control mechanism further comprises a second on-off valve, the first passage comprises an inlet passage and an outlet passage, the second on-off valve is connected between the inlet passage and the outlet passage, and the controller is in electrical communication with the second on-off valve.

11. The faucet device with the self-cleaning function according to claim 1, wherein:

the first passage comprises an inlet passage and an outlet passage in communication with the inlet passage, and the faucet mechanism further comprises a passage unit defining the outlet passage and second passage.

12. The faucet device with the self-cleaning function according to claim 11, wherein:

the passage unit has a pipe-in-pipe construction and comprises an inner pipe and an outer pipe, the inner pipe defines the second passage, and the outlet passage is defined between the inner pipe and the outer pipe.

13. The faucet device with the self-cleaning function according to claim 1, wherein:

the control mechanism further comprises a switch unit connected to the beverage inlet passage, the cleaning liquid inlet passage, and the second passage.

14. The faucet device with the self-cleaning function according to claim 1, wherein:

the air supply mechanism comprises an air pump, and the cleaning liquid is purified water.

15. A method of supplying the beverage using the faucet device with the self-cleaning function according to claim 1, comprising:

a beverage supplying operation, and a self-cleaning operation, wherein:

the beverage supplying operation comprises:

placing the second passage in communication with the beverage inlet passage, turning off the air supply mechanism and the cleaning liquid inlet passage, and supplying the beverage from the second passage;

the self-cleaning operation comprises selecting a first cleaning method and a second cleaning method according to a setting or according to user control, the first cleaning method comprises:

placing the second passage in communication with the air supply mechanism, turning off both the beverage inlet passage and the cleaning liquid inlet passage, supplying the cleaning air into the second passage by the air supply mechanism, and cleaning the second passage by the cleaning air, and the second cleaning method comprises:

a) placing the inlet of the second passage in communication with the cleaning liquid inlet passage, turning off both the air supply mechanism and the beverage inlet passage, supplying the cleaning liquid to the second passage by the cleaning liquid inlet passage, and cleaning the second passage by the cleaning liquid; and b) placing the inlet of the second passage in communication with the air supply mechanism, turning off the beverage inlet passage and the cleaning liquid inlet passage, supplying the cleaning air to the second passage by the air supply mechanism, and cleaning the second passage by the cleaning air.

16. A faucet device with a self-cleaning function, comprising:

a faucet mechanism, a control mechanism, a self-cleaning mechanism, and a beverage inlet passage, wherein:

the beverage inlet passage is configured such that the beverage inlet passage receives a beverage, the faucet mechanism comprises a first passage through which water is supplied and a second passage through which the beverage is supplied, the control mechanism is connected to an inlet of the second passage, the beverage inlet passage, and the self-cleaning mechanism, the control mechanism controls the beverage inlet passage such that the beverage inlet passage supplies the beverage to the second passage or cleans the second passage by the self-cleaning mechanism, the first passage comprises an inlet passage and an outlet passage in communication with the inlet passage, the faucet mechanism further comprises a passage unit defining the outlet passage and second passage, the passage unit has a pipe-in-pipe construction and comprises an inner pipe and an outer pipe, the inner pipe defines the second passage, and the outlet passage is defined between the inner pipe and the outer pipe.

* * * * *